(12) United States Patent
Liang

(10) Patent No.: US 7,023,622 B2
(45) Date of Patent: Apr. 4, 2006

(54) MINIATURE MICROSCOPE OBJECTIVE LENS

(75) Inventor: Chen Liang, Tucson, AZ (US)

(73) Assignee: DMetrix, Inc., Tucson, AZ (US)

( * ) Notice: Subject to any disclaimer, the term of this patent is extended or adjusted under 35 U.S.C. 154(b) by 100 days.

(21) Appl. No.: 10/247,811

(22) Filed: Sep. 18, 2002

(65) Prior Publication Data

US 2004/0051957 A1  Mar. 18, 2004

Related U.S. Application Data

(60) Provisional application No. 60/401,436, filed on Aug. 6, 2002.

(51) Int. Cl.
*G02B 21/02* (2006.01)

(52) U.S. Cl. ...................... 359/661; 359/660

(58) Field of Classification Search ......... 359/656–661
See application file for complete search history.

(56) References Cited

U.S. PATENT DOCUMENTS

| | | | | |
|---|---|---|---|---|
| 4,190,330 A | * | 2/1980 | Berreman | 349/200 |
| 4,257,679 A | * | 3/1981 | Okawa | 359/774 |
| 4,270,838 A | * | 6/1981 | Furusawa et al. | 359/385 |
| 4,301,252 A | * | 11/1981 | Baker et al. | 435/303.1 |
| 4,326,779 A | | 4/1982 | Rybicki et al. | |
| 4,484,802 A | * | 11/1984 | Kikuchi | 359/774 |
| 4,484,803 A | * | 11/1984 | Arai | 359/794 |
| 4,721,372 A | * | 1/1988 | Yokota | 359/658 |
| 4,911,782 A | * | 3/1990 | Brown | 216/33 |
| 4,974,094 A | * | 11/1990 | Morito | 348/370 |
| 5,200,152 A | * | 4/1993 | Brown | 422/102 |
| 5,214,537 A | * | 5/1993 | Maruyama | 359/644 |
| 5,260,826 A | | 11/1993 | Wu | 359/368 |
| 5,321,550 A | * | 6/1994 | Maruyama et al. | 359/618 |
| 5,499,112 A | * | 3/1996 | Kawai et al. | 358/475 |
| 5,503,803 A | * | 4/1996 | Brown | 422/102 |
| 5,519,532 A | * | 5/1996 | Broome | 359/435 |
| 5,742,419 A | * | 4/1998 | Dickensheets et al. | 359/201 |
| 5,748,371 A | * | 5/1998 | Cathey et al. | 359/558 |
| 5,748,372 A | * | 5/1998 | Kitagawa | 359/565 |
| 5,861,113 A | * | 1/1999 | Choquette et al. | 264/1.24 |
| 5,871,558 A | * | 2/1999 | Takei et al. | 65/17.2 |

(Continued)

FOREIGN PATENT DOCUMENTS

CN    1104770    7/1995

(Continued)

OTHER PUBLICATIONS

S. Yashvinder, et al., Slit-scanning confocal microendoscope for high-resolution in vivo imaging, Applied Optics, Dec. 1, 1999, pp. 7133-7144, vol. 38, No. 34.

(Continued)

*Primary Examiner*—Scott J. Sugarman
(74) *Attorney, Agent, or Firm*—Birdwell & Janke, LLP

(57) ABSTRACT

A miniature microscope objective for a miniature microscope array (MMA) includes preferably at least three or four lenses including from object to image a first positive lens, a second positive lens and a third negative lens. The objective has a numerical aperture (NA) that provides diffraction limited performance, and is preferably between 0.4 and 0.9 for the four lens design. The magnification of the objective is below approximately the outer diameter (OD) divided by the field of view (FOV), and is preferably between approximately 1 and 12, and is further preferably greater than 4. The ratio of magnification (M) to numerical aperture (NA) for the objective thereby has a magnitude that is less than substantially 30.

61 Claims, 12 Drawing Sheets

U.S. PATENT DOCUMENTS

| | | | |
|---|---|---|---|
| 5,889,618 A | 3/1999 | Fukutake | |
| 5,907,425 A * | 5/1999 | Dickensheets et al. | 359/224 |
| 5,976,425 A * | 11/1999 | Nomura et al. | 264/2.2 |
| 6,007,208 A * | 12/1999 | Dickensheets et al. | 359/872 |
| 6,023,495 A * | 2/2000 | Adler et al. | 378/4 |
| 6,027,208 A * | 2/2000 | Amano | 347/70 |
| 6,040,943 A * | 3/2000 | Schaub | 359/565 |
| 6,064,529 A * | 5/2000 | McDonald et al. | 359/637 |
| 6,069,738 A * | 5/2000 | Cathey et al. | 359/558 |
| 6,088,145 A * | 7/2000 | Dickensheets et al. | 359/196 |
| 6,094,411 A | 7/2000 | Matsuda | 369/102 |
| 6,097,485 A * | 8/2000 | Lievan | 356/338 |
| 6,101,028 A * | 8/2000 | Heacock et al. | 359/368 |
| 6,105,395 A * | 8/2000 | Yoshida et al. | 65/102 |
| 6,133,986 A * | 10/2000 | Johnson | 355/67 |
| 6,150,653 A * | 11/2000 | Assadi et al. | 250/216 |
| 6,154,305 A * | 11/2000 | Dickensheets et al. | 438/24 |
| 6,175,655 B1 * | 1/2001 | George et al. | 382/257 |
| 6,177,980 B1 * | 1/2001 | Johnson | 355/67 |
| 6,181,481 B1 * | 1/2001 | Yamamoto et al. | 359/661 |
| 6,191,881 B1 * | 2/2001 | Tajima | 359/254 |
| 6,201,899 B1 * | 3/2001 | Bergen | 382/284 |
| 6,260,997 B1 * | 7/2001 | Claybourn et al. | 374/45 |
| 6,320,174 B1 | 11/2001 | Tafas | 250/208.1 |
| 6,327,102 B1 * | 12/2001 | Naulleau et al. | 359/802 |
| 6,341,180 B1 * | 1/2002 | Pettersson et al. | 382/255 |
| 6,400,514 B1 * | 6/2002 | Minami et al. | 359/660 |
| 6,582,362 B1 * | 6/2003 | Konno | 600/167 |
| 2001/0006783 A1 | 7/2001 | Nogami | 435/6 |
| 2003/0067680 A1 | 4/2003 | Weinstein | 359/372 |
| 2003/0067861 A1 * | 4/2003 | Kimura | 369/112.26 |
| 2003/0103262 A1 | 6/2003 | Descour et al. | |
| 2003/0108347 A1 | 6/2003 | Manico | 396/207 |
| 2003/0123155 A1 | 7/2003 | Quake | 359/664 |

FOREIGN PATENT DOCUMENTS

| | | |
|---|---|---|
| CN | 1335527 | 2/2002 |
| DE | 31 38 587 A1 | 5/1982 |
| DE | 37 01 013 A1 | 7/1988 |
| DE | 197 44 246 A 1 | 4/1999 |
| DE | 199 06 960 A1 | 8/2000 |
| EP | 0 697 602 A2 | 2/1996 |
| EP | 0 751 533 A1 | 1/1997 |
| EP | 0807840 A2 | 11/1997 |
| EP | 0 951 861 A1 | 10/1999 |
| GB | 2 062 276 A | 5/1981 |
| GB | 2 197 981 A | 6/1988 |
| GB | 2 340 332 A | 2/2000 |
| WO | WO 97/34171 | 9/1997 |
| WO | WO 99/04301 | 1/1999 |
| WO | WO 99/22226 | 5/1999 |
| WO | WO 00/20898 | 4/2000 |
| WO | WO 01/84130 A2 | 4/2001 |
| WO | WO 02/075370 A2 | 9/2002 |
| WO | WO 03/025838 A1 | 3/2003 |

OTHER PUBLICATIONS

J. Knittel, et al., Endoscope-compatible confocal microscope using a gradient index-lens system, Optics Communications, Feb. 15, 2001, pp. 267-273. No. 188.

J. R. Benford, Microscope Objectives, Ch. 4 in Applied Optics and Optical Engineering, vol. 333, ed. R. Kingslake (Academic Press, 1965).

D.S. Goodman, Basic Optical Instruments, Ch. 4 in Geometrical and Instrumental Optics, D. Malacara, ed. (Academic Press, 1988) pp. 67-99 and pp. 158-173.

S.L. Webb, et al., Design of a 600-Pixel-per-Inch, 30-Bit Color Scanner, Hewlett-Packard Journal, Feb. 1997, Article 8, p. 1-10.

J.M. Sasian, et al., Design Approaches with a Lenslet Array and a Single, High-Numberical-Aperture Annular-Field Objective Lens for Optical Data Storage Systems that Incorporate Large Numbers of Parallel Read-Write-Erase Channels, Applied Optics, (Mar. 1, 1999), vol. 38, No. 7, pp. 1163-1168.

M.R. Descour, et al., A Ring-Toric Lens for Focus-Error Sensing in Optical Data Storage, Applied Optics, (Mar. 10, 1999), vol. 38, No. 8, pp. 1388-1392.

J.T. Rantala, et al., Direct UV Patterning of Thick Hybrid Glass Films for Micro-Opto-Mechanical Structures,(Mar. 16, 2000), Electronics Letters, vol. 36, No. 6, pp. 530-531. NSF Award Abstract—#0124922, AWSFL008-DS3, start date: Aug. 1, 2001.

M.R. Descour, et al., Toward the Development of Miniaturized Imaging Systems for Detection of Pre-Cancer, IEEE Journal of Quantum Electronics, (Feb. 2002), vol. 38, No. 2, pp. 122-130.

C. Liang, et al., Design of a High-Numerical-Aperture Miniature Microscope Objective for an Endoscopic Fiber Confocal Reflectance Microscope, Applied Optics, (Aug. 1, 2002), vol. 41, No. 22, pp. 4603-4610.

C. Liang, Design of Miniature Microscope Objective Optics for Biomedical Imaging, provisional U.S. Appl. No. 60/401,436, filed Aug. 6, 2002.

* cited by examiner

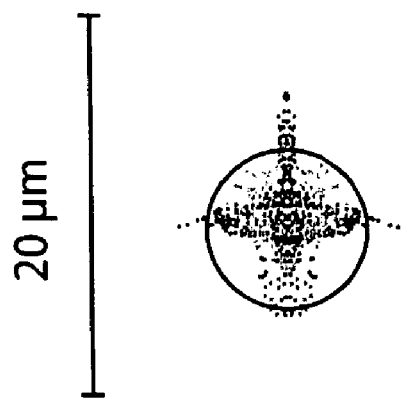
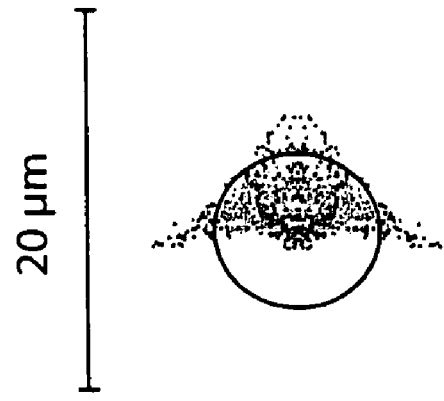
Fig. 3C                    Fig. 3D

MINIATURE MICROSCOPE OBJECTIVE LENS

CROSS REFERENCE TO RELATED APPLICATIONS

This application is related to United States patent application serial number not yet assigned to Descour et al., entitled, "Multimodal Miniature Microscope," filed Sep. 6, 2002, which claims priority to U.S. provisional application Ser. No. 60/318,059, and this application is also related to published PCT application no. PCT/US02/08286, which claims priority to U.S. provisional application No. 60/276, 498, and this application is also related to Ser. No. 60/401, 436, each application being hereby incorporated by reference.

BACKGROUND OF THE INVENTION

1. Field of the Invention

The invention relates to a miniature microscope objective for a miniature microscope array, and particularly to a miniature objective preferably including 2–4 lenses, having a numerical aperture between 0.4 and 0.9 and a magnification of around 12 or less, such that the design features a low magnification-to-numerical aperture ratio, e.g., below 30, and further preferably has a large field of view-to-diameter ratio, e.g., more than 0.1.

2. Discussion of the Related Art

Miniaturization of microscope objective optics has many potential applications in imaging. It is the enabling technology for the construction of a microscope array such as the miniature microscope array (MMA). Moreover, miniature microscope objective designs for MMA have certain characteristics that are uncommon from typical microscope objectives.

For example, it is recognized in the present invention that it would be advantageous to have a miniature microscope objective for MMA that is small in diameter, while maintaining a large field of view (FOV)-to-diameter ratio. It is further recognized in the present invention that it would be further advantageous if such objective had sufficient magnification to achieve certain resolution, while not having an excessive magnification such that the image size would grossly exceed the diameter of the optics. From a practical viewpoint, it is also desired to have a miniature microscope objective for MMA that can be constructed easily and that is cost effective.

SUMMARY OF THE INVENTION

In view of the above considerations, an advantageous miniature microscope objective has been achieved according to the present invention. The miniature microscope objective preferably includes at least three or four lenses, and may alternatively include only two lenses. The three lens design preferably includes, from object to image, a first positive lens, a second positive lens and a third negative lens (PPN). The four lens design preferably includes at least one negative lens having a PPNP configuration, and alternatively a PPPN or PPNN configuration. A two lens design would preferably comprise first positive lens and either a positive or a negative second lens.

The objective exhibits a certain numerical aperture and provides diffraction-limited performance. The absolute value of the transverse magnification (M), hereinafter referred to simply as the "magnification", is below approximately an outer diameter (OD) divided by a field of view (FOV) of the objective. A ratio of M to NA is thus less than the outer diameter OD divided by the product of field of view (FOV) and numerical aperture (NA).

Preferably, the three or four lens objective design has a numerical aperture (NA) greater than NA=0.4, while the magnification (M) is preferably maintained at a magnitude of around M=11–12 or below, and also preferably greater than M=4. Thus, the ratio of M to NA for the objective has a magnitude that is greater than 1, and preferably greater than around 4.4, and less than substantially 27.5 to 30.

The field of view (FOV) for the three or four lens designs is preferably substantially 220–240 μm or more. The outer diameter (OD) is preferably substantially 1.6–2.0 mm or less, and the ratio of FOV to OD is thereby 0.11–0.15 or more.

In particularly preferred embodiments the NA is substantially 0.6–0.7 or more, and may be limited to being less than 0.9 for a four lens objective design, and to being less than around 0.8 for a three lens objective design. In this case, the ratio of M to NA may have a magnitude between 1.1 and 18.3, wherein particular ranges will vary depending on NA and M.

In further particularly preferred embodiments, M is substantially 7 or less, and NA may be between 0.4 and 0.9. In some embodiments, NA may be NA=0.6 or more, or NA=0.7 or more, or NA=0.9. In these cases, the M to NA ratio will be 17.5 or less, or may be 11.7 or less, or 10 or less or 7.8 or less. When M is 11–12 or less, the M to NA ratio for NA-0.6 or more, 0.7 or more, or 0.9, the M to NA ratio is, respectively, 20 or less, or 17.1 or less, or 13.3 or less.

An aperture stop may be located on the front or back surface of the second positive lens or within the lens. The first positive lens may be preferably plano-convex or a meniscus design, or alternatively bi-convex. The second positive lens may be preferably bi-convex or plano-convex, or alternatively a ameniscus design. The preferred third negative lens may be a meniscus or a bi-concave design, or alternatively plano-concave. In a preferred embodiment of the four lens design, the four lenses include at least five geometrically and/or optically non-planar surfaces. For example, the negative lens preferably has two such non-planar surfaces.

The objective is preferably corrected over a bandwidth of at least substantially 10 nm. The objective may include a diffractive surface disposed, e.g., on the front surface of the second positive lens, such that the objective may be corrected over a greater bandwidth of substantially 100 nm or more.

Each lens of the objective may comprise a low-dispersion, crown-like material such as "COC", Zeonex™ and/or LAK-10. As will be understood by those skilled in the art, COC stands for cycloolefin copolymer material; Zeonex™ is a trademark of Zeon Corporation of Tokyo, Japan for a particular brand of cycloolefin polymer; and LAK-10 is a glass type designation used by Schott Corporation, located in Yonkers, N.Y., U.S.A. In another embodiment, the first and second positive lenses comprise the low-dispersion, crown-like material, and the third negative lens comprises a higher dispersion, flint-like material such as polystyrene. For the four lens design, the fourth lens may preferably comprise the low-dispersion, crown-like material. One or more of the lenses may be gradient index lenses.

A miniature microscope objective in accordance with the present invention is particularly advantageous in a miniature microscope array (MMA). In such a MMA, multiple objectives are combined into an array of miniature objectives.

BRIEF DESCRIPTION OF THE DRAWINGS

FIG. 3C shows a geometric spot diagram for the miniature microscope objective design of FIG. 2 for an object field position of 0.1 mm.

FIG. 3D shows a geometric spot diagram for the miniature microscope objective design of FIG. 2 for an object field position of 0.12 mm.

INCORPORATION BY REFERENCE

Figure 1:
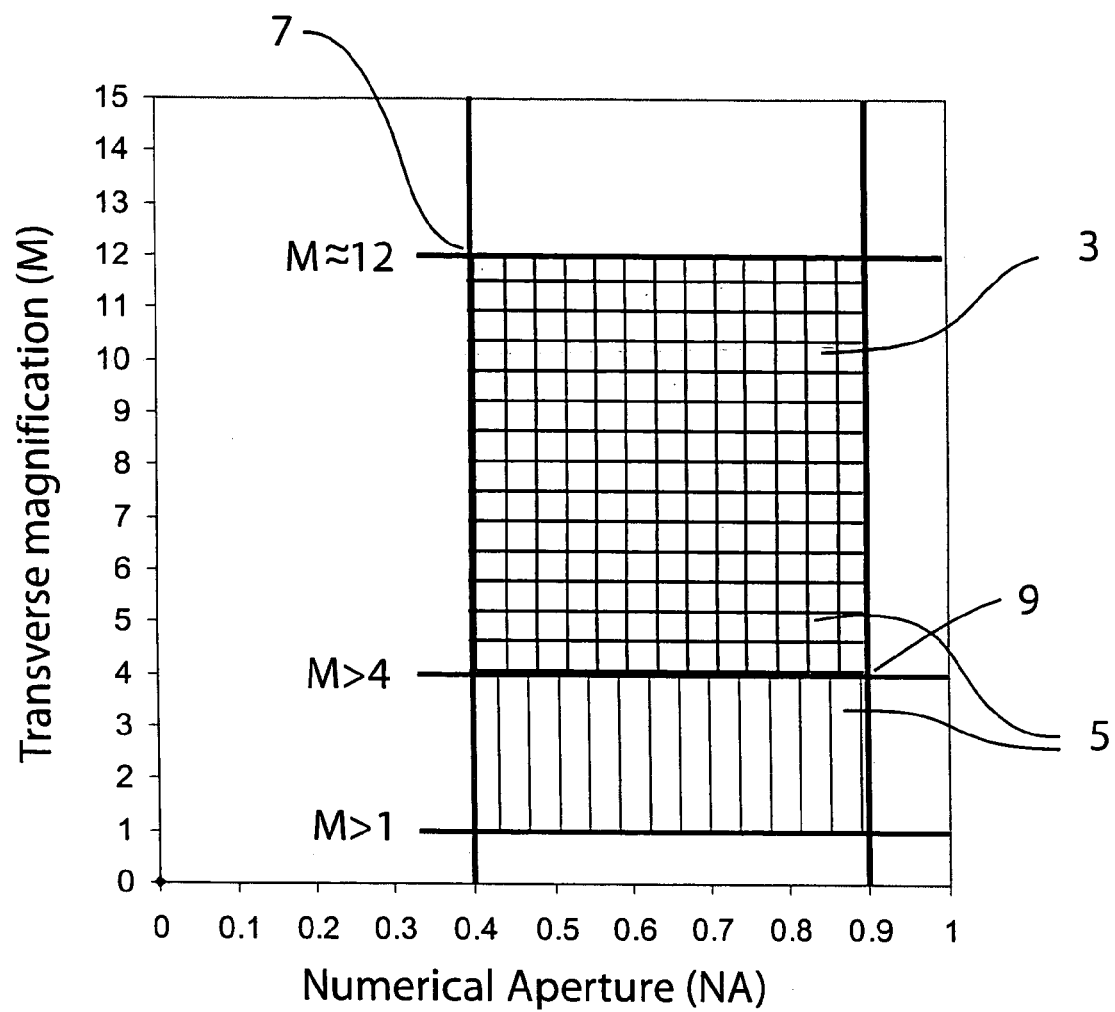
FIG. 1 is a graph of transverse magnification (M) versus NA including a shaded region illustrating a feature of a miniature microscope objective design having advantageous magnification (M), numerical aperture (NA) and M to NA ratio, according to a preferred embodiment.

What follows is a cite list of references each of which is, in addition to that which is described in the above related art description, invention summary and brief description of the drawings, the applications cited above as related applications and any referenced cited therein, and the abstract below, are hereby incorporated by reference into the detailed description of the preferred embodiment below, as disclosing alternative embodiments of elements or features of the preferred embodiments not otherwise set forth in detail below. A single one or a combination of two or more of these references may be consulted to obtain a variation of the preferred embodiments described in the detailed description below and within the scope of the present invention:

U.S. Pat. No. 6,064,529, 6,040,943, 6,023,495, 6,175,655, 5,871,558, 6,150,653, 5,861,113, 6,105,395, 5,976,425, 6,341,180, 6,191,881, 4,190,330, 5,748,371, 6,069,738, 6,201,899, 6,177,980, 6,133,986, 6,154,305, 6,088,145, 6,067,208, 5,742,419 and 5,499,112;

PCT published applications no. WO 97/34171 and PCT/US02/08286;

U.S. patent applications Ser. Nos. 60/318,059, 60/276,498, 60/401,436, and serial number not yet assigned to Descour et al., entitled, "Multimodal Miniature Microscope, filed Sep. 6, 2002;

Descour et al., Toward the Development of Miniaturized Imaging Systems for Detection of Pre-Cancer, IEEE Journal of Quantum Electronics, Vol. 38, No. 2 (February 2002);

Liang et al., Design of a high-numerical aperture miniature microscope objective for an endoscopic fiber confocal reflectance microscope, Applied Optics, Vol. 41, No. 22 (Aug. 1, 2002);

Geometrical and Instrumental Optics, Vol. 25, Methods of Experimental Physics, Daniel Malacara, ed., see particularly pp. 67–99 and 158–173, (Academic Press, 1988);

J. M. Sasian, et al., Applied Optics 38, pp. 1163–1168 (1999);

G. H. Rieke, Detection of Light: From the Ultraviolet to the Submillimeter, Ch. 7 (Cambridge University Press, 1994);

R. G. Driggers, et al., Introduction to Infrared and Electro-Optical Systems, Ch. 8 (Artech House, 1999);

Wyrowski and Turner, Diffractive Optics for Industrial and Commercial Applications, John Wiley and Sons;

H. K. Schmidt, Sol-gel and polymer photonic devices, SPIE Critical Review, Vol. CR68, pp. 192–203 (1995);

Rantala et al., Direct patterning of thick hybrid glass film for micro-opto-mechanical structures, Electronics Letters, Vol. 36, pp. 1–2 (2000);

J. R. Benford, Microscope Objectives, Ch. 4 in Applied Optics and Optical Engineering, Vol. III, ed. R. Kingslake (Academic Press, 1965);

D. Malacara, Optical Shop Testing, $2^{nd}$ edition (Wiley, 1992);

M. Mansuripur, The Principles of Magneto-Optical Recording, Ch. 8, Section 3, pp. 264–277 (Cambridge University Press, 1995); and R. R. Shannon, The Art and Science of Optical Design, (Cambridge University Press, 1997);

G. M. Morris and K. J. McIntyre, "Optical system design with diffractive optics," in Diffractive Optics for Industrial and Commercial Applications, J. Turunen and F. Wyrowski, eds., Ch. 3 (Akademie Verlag, 1997);

D. S. Goodman, "Basic Optical Instruments," Ch. 4 in Geometrical and Instrumental Optics, D. Malacara, ed. (Academic Press, 1988); and M. R. Descour, et al., A ring-toric lens for focus-error sensing in optical data storage, Applied Optics, Vol. 38, No. 8, pp. 1388–1392 (Mar. 10, 1999).

DETAILED DESCRIPTION OF THE PREFERRED EMBODIMENTS

The preferred embodiments described below include several miniature microscope objective designs each including two, or preferably three or four lenses. Designs including more than four lenses may be alternatively achieved by adding one or more lenses to the designs described below and optimizing the prescription data, e.g., using Zemax software, to include the additional lens or lenses. As will be appreciated by those skilled in the art. Zemax software is optical system design computer software produced by Zemax Development Corporation, located in San Diego, Calif., U.S.A.

For each design in accordance with preferred embodiments, the ratio of magnification (M) to numerical aperture (NA) lies within a range from greater than one (or preferably greater than around 4.4) to around 27.5, corresponding to a range of numerical apertures from greater than 0.4 to approximately 0.9 and a range of absolute values or magnitudes of transverse magnifications from around just above one (or preferably greater than 4) to around 11. Note that wherever the "magnification" of the objective is mentioned herein, either alone or as described by reference "M" or "$m_{obj}$", it is meant to be the absolute value, or magnitude, of the transverse magnification of the objective, in the case of "M", or the transverse magnification of the objective, in the case of "$m_{obj}$".

FIG. 1 is a graph of transverse magnification (M) versus NA including shaded regions 3 and 5 illustrating advantageous miniature microscope objective designs according to preferred embodiments. As shown in FIG. 1, the preferred miniature microscope objectives have NA between 0.4 and 0.9. According to shaded region 3, the magnification M is preferably between just above one and around M=11 or 12, while according to the particularly preferred shaded region 5, the magnification M is greater than M=4. Point 7 represents a maximum ratio M/NA of approximately 30, and point 9 represents a minimum ratio M/NA of approximately 4. The significance of the preferred miniature microscope objectives being maintained within these parameters is described below.

Relationship between Overall Length and Magnification

To the first order, the length of a microscope objective is related to its transverse magnification according to:

$$L = -f_e \cdot m \cdot [(1/m) - 1]^2 \quad (0.1)$$

In formula 0.1, $f_e$ is the effective focal length, m is the actual value of the transverse magnification of the microscope objective, and its magnitude is taken as being greater than 1, and L is the length of the objective. Formula 0.1 indicates that the length L increases as the absolute value of magnification m increases. It is desired to have a compact design, and accordingly, the absolute value of magnification m should be preferably small.

Also for a miniature microscope system, a minimum magnification M(min) may be used to achieve a desired sampling. The minimum magnification M(min) is related to the geometry of the image sensor, and specifically the image sensor pixel size for an image sensor that comprises a pixel array. Generally, for a smaller pixel size, a reduced magnification will achieve a same sampling. For example, for arbitrarily small pixel sizes that may be achievable in the image sensor art, the minimum magnification may approach just above M(min)≈1 in accordance with region 3 of FIG. 1. As a practical matter today, in order to achieve sufficient sampling with available image sensor pixels sizes, e.g., around 3.3 microns or more, a minimum magnification above M(min)>4 is particularly preferred in accordance with region 5 of FIG. 1.

Center-to-Center Distance

A miniature microscope objective in accordance with a preferred embodiment is intended to be included as part of an array microscope, and particularly a miniature microscope array or MMA. A diameter OD for a design according to a preferred embodiment may be around 1.6 mm. To pack as many objectives into a given area, e.g., according to an injection molding procedure as understood by those skilled in the art, the spacing between the neighboring objectives is preferably made as small as possible. Some companies understood to be involved in injection molding of plastic optics include Corning NetOptix, Polaroid Corporation, Applied Imaging Group, Polymer Optics, and RPM Optoelectronics). Further description of alternative processes for assembling the advantageous objectives of these preferred embodiments into miniature microscope arrays (MMA) are described at published PCT application no. PCT/US02/08286, incorporated by reference above. The center-to-center distance of neighboring objectives having diameters OD of 1.6 mm may be preferably around 1.8 mm or around 112.5% of the outer diameter OD of each objective. That is:

$$\text{Center-to-center distance} \approx 112.5\% \cdot \text{OD} \quad (0.2)$$

As mentioned, the center-to-center distance is preferably as small as possible so that more objectives can be packed together in a given cross-sectional area. However, if the center-to-center distance is too small, then fabrication of the array can be more difficult. Additionally, if the center-to-center distance is too small, cross-talk between neighboring objectives can become severe. We have generally found that when the center-to-center distance to OD ratio is maintained at or above 112.5% according to formula 0.2, then cross-talk may be maintained within tolerable limits.

FOV and Magnification

A large FOV is generally desired for a microscope objective. However, if we are considering an array microscope for a given magnification, and particularly one having the objectives packed together as close to the cross-talk tolerance limit formula 0.2 (above) as possible, then an upper limit on the FOV depends on the images from neighboring microscopes in a row not having overlap. Even for a single objective microscope, there are applications wherein it is desired to maintain the image size within the diameter of the optics, and an example would be an endoscope.

A miniature microscope objective according to a preferred embodiment may have NA, e.g., around 0.6, and generally between 0.4 and 0.9 in accordance with FIG. 1, and a full FOV for each objective in the array, e.g., around 220 μm to 240 μm. Larger magnification M enables finer sampling of the image and therefore M (min)>4 according to FIG. 1. As introduced above, however, for a given FOV, the magnification M has an upper limit determined by the magnification M not being so large that images from adjacent objectives overlap. In view of this, an upper limit on the magnification of a miniature microscope objective in accordance with a preferred embodiment may be determined approximately by the following formula 0.3:

$$m_{obj} \text{ (upper limit)} \approx 95\% \cdot \text{Center to center distance/Full FOV} \quad (0.3)$$

By substituting formula 0.2 into formula 0.3 for the center to center distance, a relationship for determining the upper limit on the magnification in terms of the Full FOV and OD is provided as formula 0.4:

$$m_{obj} \text{ (upper limit)} \approx 1.06875 \cdot \text{OD/Full FOV} \quad (0.4)$$

For microscope array applications that image a large continuous object, it is preferred that FOV gaps between neighboring objectives in a row be covered using additional rows of objectives. The total number of rows is partially determined by the FOV to OD ratio. For example, approximately eight rows correspond to a FOV-to-OD ratio of 0.15, in accordance with a particularly preferred embodiment wherein the magnification has a magnitude of about 7. Currently preferred array assembly techniques provide for packing the objectives into a hex array. The distances between the rows are 1.5 mm. The image sensor is lithographically printed on Si wafers and the wafer size is 20 mm by 20 mm. Twelve rows of objectives (or less) will fit comfortably, 13 rows will fit tightly, and 14 rows will not presently fit. Also from a practical point of view, there is an upper limit of about 12 rows of objectives for the MMA due to considerations of throughput in scanning a continuous image, because the more rows there are, the longer the array is in the scanning direction and the longer the scan will take.

These 12 rows of objectives correspond to a FOV-to-OD ratio of about 0.1, or the number of rows, i.e., 12, times the FOV-to-OD ratio is about 1.2. The FOV-to-OD ratio has a lower limit of about 0.1 according to a preferred embodiment. The FOV-to-OD ratio is around 0.15 for the preferred embodiment including around 8 rows, or 8 times 0.15=1.2. So, if one desired to tightly pack the 13 rows, then the lower limit may be reduced to about $1.2/13 \approx 0.09$. Therefore, the upper limit on the magnification M (upper limit) is around 1.06875/0.1 or around 10.7 or M (upper limit)$\approx 11$ for a 12 row array and around M (upper limit)$\approx 11.6 \approx 12$ for a 13 row array.

With regard to M(lower limit), any actual minimum restriction on the value of M really depends on specifications of the image sensor used for detecting the image, as briefly discussed above with reference to regions 3 and 5 of FIG. 1. That is, advantageous objectives may be achieved having smaller and smaller M to NA ratios, i.e., within the NA constraints set forth below, as long as the image sensor pixel size is correspondingly reduced considering the resolution. Current commercially-available image sensors have pixel sizes down to approximately 3.3 μm and there is every expectation that sensors with smaller and smaller pixel sizes will be evolved. Therefore, an advantageous design having NA(max)$\approx 0.9$ may have a magnification as low as just above M=1 for arbitrarily small image sensor array pixel sizes according to region 3 of FIG. 1. For NA=0.9, e.g. (see below), an objective in accordance with a preferred embodiment may have a M to NA ratio as low as around (M/NA) $\approx 1/0.9 \approx 1.1 \approx$ just above 1. However, as a practical matter, presently available image sensor array pixel sizes provide that the magnification M should be greater than 4 to achieve proper resolution and sampling, and thus M to NA may have a present lower limit of $4/0.9 \approx 4.4 \approx 4$.

As an example, biological components such as cellular components, or normal or abnormal features within cell structures or components, can be very small, e.g., around 1–2 microns or less. For an image sensor including 3.3 micron pixels and an objective having a magnification $m_{obj}$32 4, images of objects just under one micron would not be resolved, and if following the Rayleigh criterian, images of objects just under two microns would not be resolved. It is therefore desired to have a magnification $m_{obj}$ that is greater than four, such as preferably between $m_{obj}$>4 and $m_{obj} \leq 11$–12. For example, miniature microscope objectives according to preferred embodiments described in detail below have a magnification around $m_{obj}$26 7.

NA Range and NA/$m_{obj}$ Ratio

As illustrated at FIG. 1, the numerical aperture (NA) for the preferred miniature microscope objective is in a range between NA$\approx 0.4$ and NA$\approx 0.9$. This lower limit is in part determined based on performance criteria involving other parameters such as field of view (FOV), working distance (WD), and diameter (OD). For example, a two lens design was developed in our research which achieved a NA of 0.4 and a more preferred three or four lens design may be achieved with NA=0.4 and even higher. A series of simulations in ZEMAX confirmed that our designs would exhibit advantageous performance even as both NA and the NA to M ratio of the two-lens design were varied over the ranges illustrated in the graph of FIG. 1. As mentioned above, additional constraints exist for miniature microscope objectives for array microscopes that are not present for single objective microscopes, and these have been taken into consideration in providing the preferred embodiments herein. Optical performances have been confirmed in terms of Strehl ratios and distortion for various M-to-NA ratios.

Figure 2:
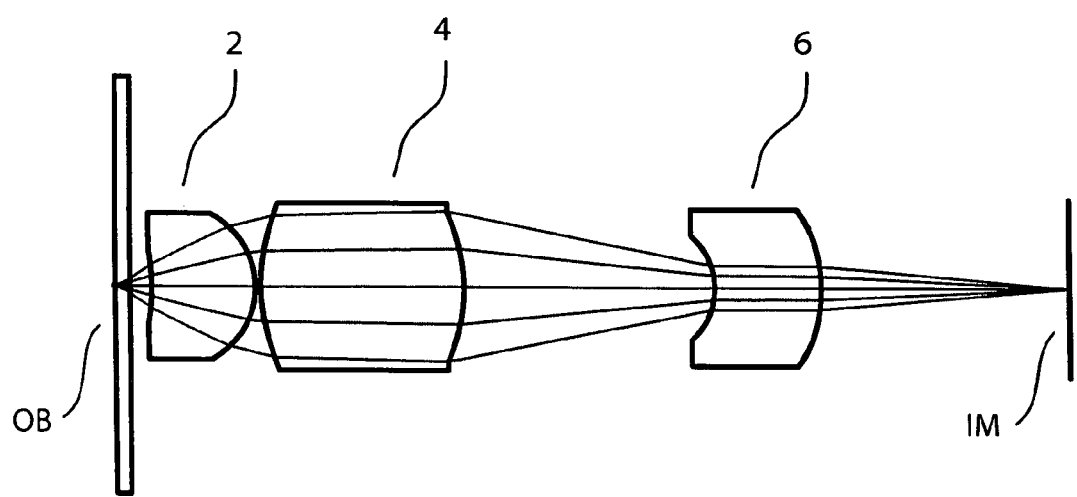
FIG. 2 schematically illustrates an optical layout for a three lens (PPN) miniature objective design for MMA according to a preferred embodiment.

As described in more detail below, the preferred three lens design that is schematically illustrated at FIG. 2 has NA=0.6 and M=7, such that (M/NA)=12. Beginning with these values from the preferred design, and for other M-to-NA ratios with computer assistance, it is preferred that NA have a lower limit at a threshold value below which the optical performance is degraded below the diffraction limit. This occurs when the Strehl ratio is below 0.8 at any field position. Based on this, it was determined that for the range of magnification-to-NA ratios, optical performance will be degraded below the diffraction limit at around NA=0.4. This value has been confirmed by ZEMAX simulation. As it is particularly desired to have diffraction-limited performance, a miniature microscope objective for MMA according to a preferred embodiment has NA=0.4 or more. A two lens miniature microscope objective according to an embodiment described herein with NA=0.4 provides advantage for use with MMA. A three lens design having NA between 0.4 and 0.8 and a four lens design having NA between 0.4 and 0.9 are particularly preferred. Moreover, it is generally further desired to have a somewhat larger NA, and thus three or four lens arrangements are particularly preferred, as described below with reference to FIGS. 2–8.

An extreme upper NA limit for a dry microscope objective is generally approximately NA=0.95. Moreover, our research confirms that a three lens design having NA$\approx 0.8$ or a four lens design having NA$\approx 0.9$, each demonstrating reasonable performance may be achieved.

The magnification to NA ratio will increase if the objective is operating at a smaller NA. The NA may be reduced by stopping down the aperture stop of the system. For example, a preferred objective may have NA=0.6 and $M_{obj}$=7. The ratio of magnification to NA is then approximately 12. If the aperture stop is reduced so that the objective is operated at NA=0.4, e.g., and the upper limit of $m_{obj}$ is used, i.e., $m_{obj} \approx 11$ or 12, then the magnification to NA ratio will be approximately 27.5 or 30. Correspondingly, if the NA of the preferred design is increased to its upper limit of NA=0.9 and the magnification reduced to around 1, then the ratio of magnification to NA will become approximately 1.1 or just above 1, such that a preferred range of $m_{obj}$ to NA is between about 1 and 27.5. Again, for the practical lower limit of $m_{obj}$>4, the ratio of magnification to NA will have a lower limit of around 4.4 or approximately 4 For perspective, a conventional objective typically has a magnification-to-NA ratio of around 50. Thus, the range of $m_{obj}$ to NA ratio for the miniature microscope objective for MMA according to preferred embodiments significantly differs from that of conventional microscope objectives, i.e., it is significantly smaller.

Equation 0.3, above, indicates that FOV and magnification are reciprocally dependent for a given center to center distance of the array of miniature objectives. That is, the FOV and magnification product is constrained to be less than or comparable to around 1.06875OD. An enhanced constraint on the minimum magnification, i.e., substantially above $m_{obj}$=between 1 and 4, may be desired to provide enhanced sampling of the image. For an NA=0.6 microscope objective (NA=0.6 in object space) 0.5 μm sampling is required for its intended application. Therefore, a minimum magnification of approximately 7 is needed to provide sufficient sampling for pixel size of 3.3 μm. If such sampling constraints are relaxed, then the FOV may be increased in combination with a reduction of the magnification and corresponding reduction of the magnification to NA ratio.

Three Lens Miniature Microscope Objectives

A preferred embodiment of a miniature microscope objective for MMA having three lenses 2, 4 and 6 from an object plane OB to an image IM, and NA=0.6 is schematically shown in FIG. 2. Corresponding spot diagrams are provided at FIGS. 3A, 3B, 3C and 3D, and MTF plots are provided at FIG. 3E. The spot diagrams are for four different object field positions, as shown in Table 1, and are each formed by ray traces for three different wavelengths, that is, 590 nm 595 nm and 585 nm so as to model a real light emitting diode light source. Corresponding prescription data including information such as radius, thickness, and aspherical coefficient are provided at Table 1, below (note that all distance values in Table 1, as well as Tables 4–8, further below, are in units of millimeters mm).

TABLE 1

DIMENSIONAL DATA FOR SPOT DIAGRAMS OF FIGS. 3A, 3B, 3C AND 3D

Figure 3A:
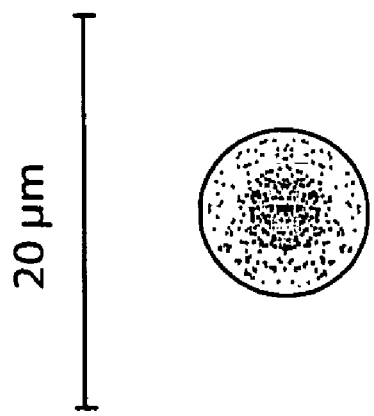
FIG. 3A shows a geometric spot diagram for the miniature microscope objective design of FIG. 2 for an on-axis object field position.
Figure 3B:
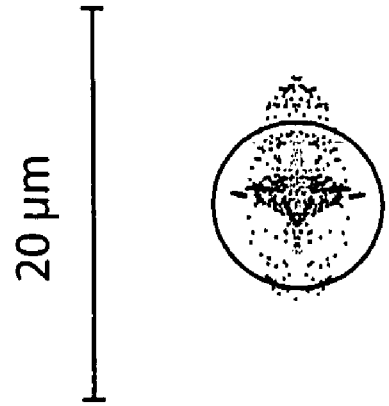
FIG. 3B shows a geometric spot diagram for the miniature microscope objective design of FIG. 2 for an object field position of 0.07 mm.
Figure 3E:
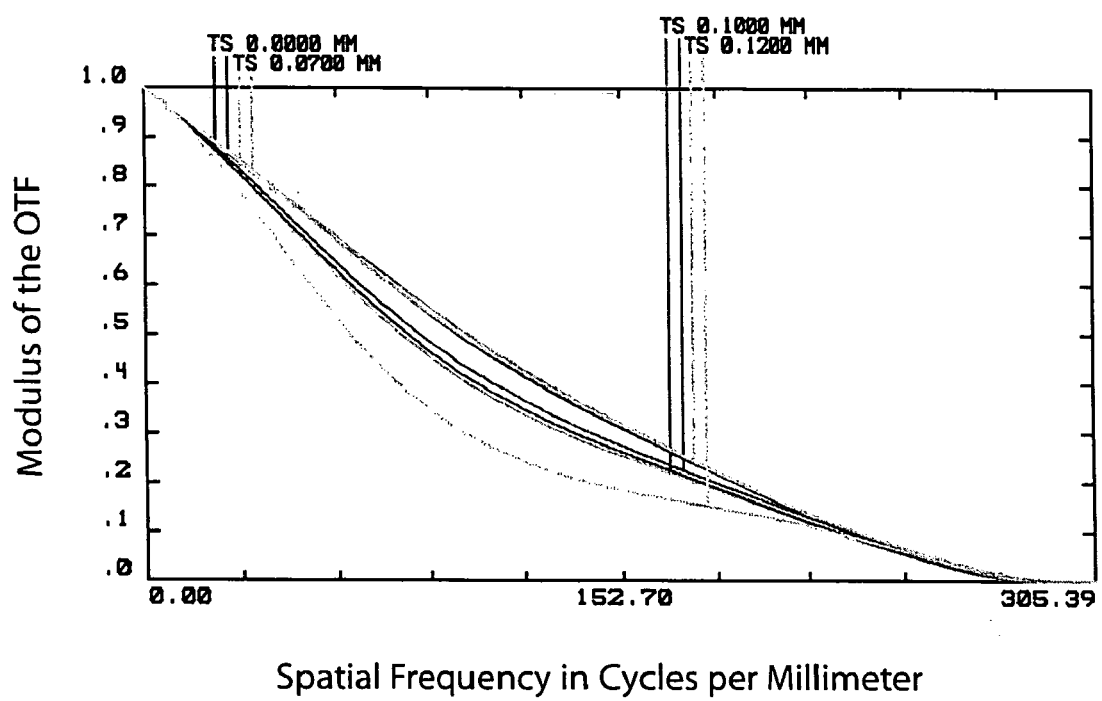
FIG. 3E shows MTF plots for the miniature microscope objective design of FIG. 2.

| | FIG. 3A | FIG. 3B | FIG. 3C | FIG. 3D |
|---|---|---|---|---|
| Field Position (mm) | 0 | 0.07 | 0.1 | 0.12 |
| RMS Radius (μm) | 1.75 | 2.446 | 2.763 | 3.153 |
| Geometric Radius (μm): | 3.783 | 6.685 | 7.177 | 7.529 |

This design has a FOV of 240 μm, a working distance (WD) over 150 μm and transverse magnification of −7. From object OB to image IM, the three lenses include a first positive lens 2, a second positive lens 4, and a third negative lens 6. That is, the design of FIG. 2 is a PPN design, where "P" denotes a positive lens and "N" denotes a negative lens as understood by those skilled in the art. Positive and negative lenses are defined by the paraxial characteristics of the lens. The first positive lens 2 may be preferably either plano-convex or meniscus. The second positive lens 4 may be preferably either biconvex or plano-convex. The third negative lens 6 may be preferably either meniscus or bi-concave. The third negative lens 6 also serves to correct field curvature. A stop aperture (not shown) for this design may be preferably located on the back surface of the second lens, or that surface of the second lens which faces the image. Alternatively, the stop aperture may be located on the front surface of the second lens, i.e., facing the object. Alternatively the stop aperture can be placed inside the second lens. Placing the stop aperture inside the lens is generally impractical but possible. The back surface of the last lens may be preferably convex. This surface being convex contributes to reduce ghost reflection. For example stray light reflected off from the detector and then from the last surface on lens 6 will rapidly diverge and will not contribute to a strong ghost image on the detector.

TABLE 1

PRESCRIPTION FOR FIG. 2, THREE LENS DESIGN

| Surf | Radius | Thickness | Glass | Diameter | Conic | 4th order | 6th order | 8th order |
|---|---|---|---|---|---|---|---|---|
| OBJ | Infinity | 0.150 | BK7 | 0.240 | 0 | | | |
| 1 | Infinity | 0.200 | | 0.390 | 0 | | | |
| 2 | −1.895 | 1.004 | COC | 0.668 | 0 | | | |
| 3 | −0.752 | 0.050 | | 1.397 | −0.226 | | | |
| 4 | 1.732 | 1.938 | COC | 1.607 | −2.568 | | | |
| STO | −1.646 | 2.437 | | 1.450 | 0 | 0.0232 | 0.0257 | −0.0087 |
| 6 | −0.669 | 1.000 | COC | 0.966 | 0 | | | |
| 7 | −1.507 | 2.414 | | 1.474 | 1.010 | | | |
| IMA | Infinity | | | 1.698 | 0 | | | |

This miniature objective design of FIG. 2 and Table 1 and according to a preferred embodiment is telecentric in object space. The design of FIG. 2 and Table 12 may also be modified by one skilled in the art to be telecentric in image space, as well.

The diameter OD of the three lens design of FIG. 2 is less than substantially 1.6 mm. The FOV/OD ratio is around 0.15, although this ratio may be advantageously increased by increasing the FOV or decreasing OD. The tranverse magnification is about 7× and the ratio of magnification to NA is approximately 11.7.

This design is corrected over a narrow bandwidth Δλ of approximately 10 nm. This design can be used to operate at a varied of selected center wavelengths over the visible spectrum by adjusting the object/image conjugate, and UV and IR wavelengths may be selected. The bandwidth may be advantageously increased by providing a diffractive surface or more than one diffractive surface. For example, a diffractive surface can be placed at the front surface (i.e., facing the object) of the second positive lens. Such addition of a diffractive surface can serve to increase the corrected bandwidth to more than Δλ≈100 nm.

All three lenses 2, 4 and 6 of the objective of FIG. 2 and Table 1 are preferably made of cycloolefin copolymer (COC) or Zeonex™ material. Alternatively, any or all of the lenses may be made of a number of other plastic or glass materials. Although it is beneficial to use the same material for all three lenses from a fabrication perspective, a combination of different materials can be used. For example, the positive lenses 2 and 4 are generally preferably made of a "crown-like" material (i.e., a material having a relatively low dispersion) and the negative lens 6 is generally preferably made of a "flint-like" material (i.e., a material having a higher dispersion than crown-like materials). Chromatic aberration correction is thereby advantageously achieved. If only a single material is used, then a low dispersion crown-like material would be preferred. The lenses 2, 4 and/or 6 can also be made using gradient index lenses.

Four Lens Miniature Microscope Objectives

Figure 4:
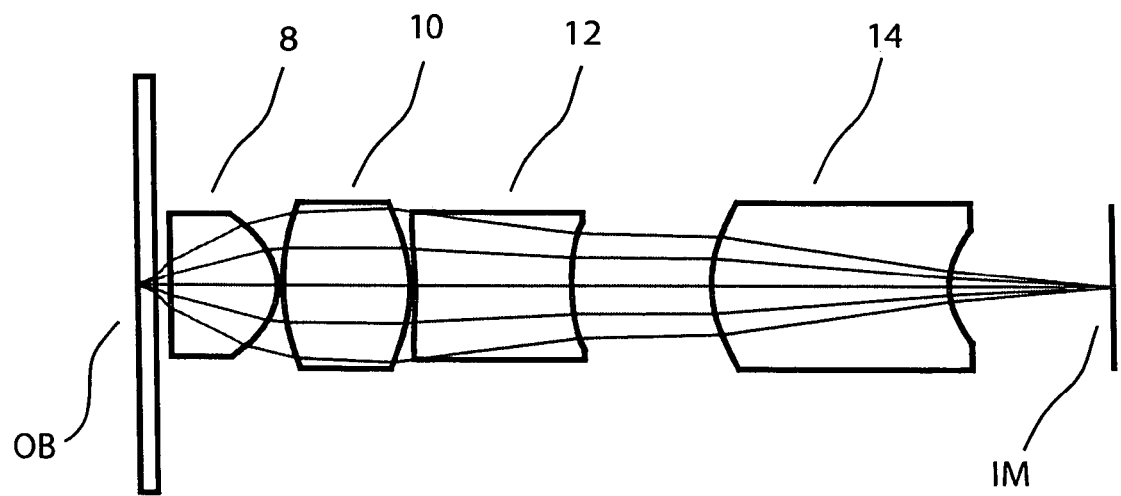
FIG. 4 schematically illustrates an optical layout for a four lens (PPNP) miniature objective design for MMA according to a preferred embodiment.

A preferred four lens miniature microscope objective having lenses 8, 10, 12 and 14 from object OB to image IM is schematically illustrated at FIG. 4. Corresponding spot diagrams are provided at FIGS. 5A, 5B, 5C and 5D, and MTF plots are provided at FIG. 5E. The spot diagrams are for four different object field positions, as shown in Table 3, and are each formed by ray traces for three different wavelengths, that is, 590 nm, 595 nm and 585 nm, so as to model a real light emitting diode light source. Corresponding prescription data such as radius, thickness, and aspherical coefficient are provided at Table 4, below.

TABLE 3

DIMENSIONAL DATA FOR SPOT DIAGRAMS OF FIGS. 5A, 5B, 5C AND 5D

Figure 5A:
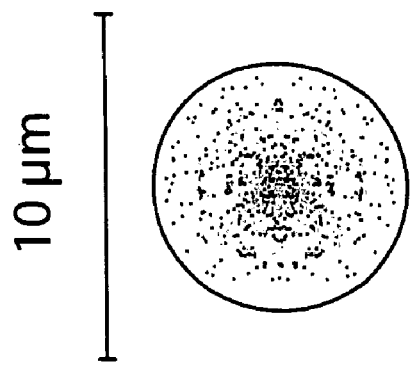
FIG. 5A shows a geometric spot diagram for the miniature microscope objective design of FIG. 4 for an on-axis object field position.
Figure 5B:
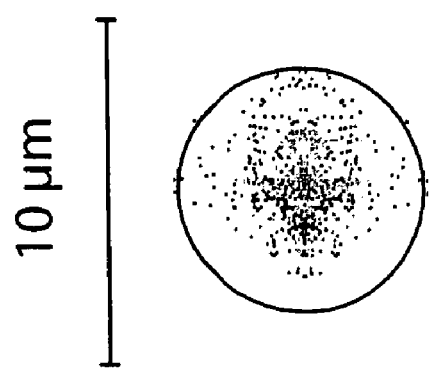
FIG. 5B a geometric spot diagram for the miniature microscope objective design of FIG. 4 for an object field position of 0.07 mm.
Figure 5C:
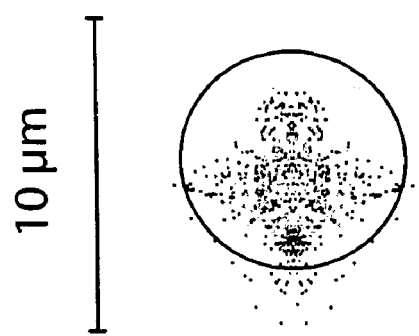
FIG. 5C shows a geometric spot diagram for the miniature microscope objective design of FIG. 4 for an object field position of 0.1 mm.
Figure 5D:
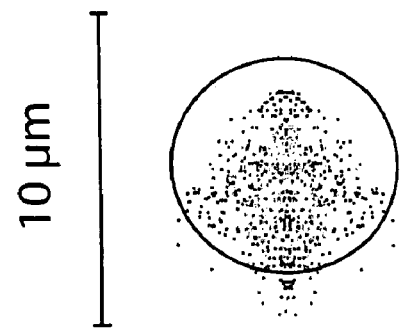
FIG. 5D shows a geometric spot diagram for the miniature microscope objective design of FIG. 4 for an object field position of 0.12 mm.
Figure 5E:
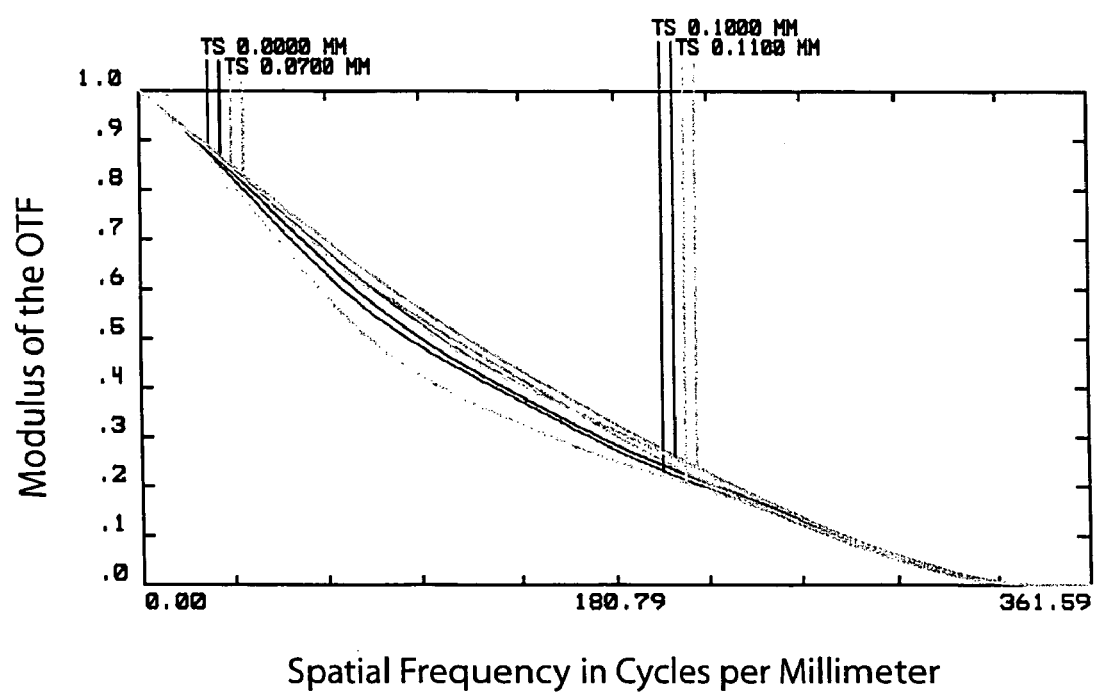
FIG. 5E shows MTF plots for the miniature microscope objective design of FIG. 4.

|  | FIG. 5A | FIG. 5B | FIG. 5C | FIG. 5D |
|---|---|---|---|---|
| Field Position (mm) | 0 | 0.07 | 0.1 | 0.12 |
| RMS Radius (μm) | 1.708 | 1.564 | 2.023 | 2.326 |
| Geometric Radius (μm): | 3.249 | 4.17 | 6.337 | 7.136 |

TABLE 4

PRESCRIPTION FOR FIG. 4, FOUR LENS DESIGN

| Surf | Radius | Thickness | Glass | Diameter | Conic | 4th term | 6th term | 8th term |
|---|---|---|---|---|---|---|---|---|
| OBJ | Infinity | 0.15 | BK7 | 0.220 | 0 | | | |
| 1 | Infinity | 0.15 | | 0.397 | 0 | | | |
| 2 | Infinity | 1 | COC | 0.712 | 0 | | | |
| 3 | −0.61 | 0.05 | | 1.372 | −0.647 | | | |
| 4 | 2.08 | 1.2 | COC | 1.600 | −2.467 | | | |
| 5 | −1.43 | 0.05 | | 1.599 | −2.84 | | | |
| STO | −3.21 | 1.49 | POLY-STYR | 1.417 | 0 | 0.321 | −0.2 | 0.073 |
| 7 | 2.19 | 1.3 | | 1.234 | 6.86 | | | |
| 8 | 1.16 | 2.3 | COC | 1.600 | 0 | −0.155 | −0.038 | |
| 9 | 0.64 | 1.494649 | | 1.092 | −1.87 | | | |
| IMA | Infinity | | | 1.555 | 0 | | | |

The powers of the four lenses 8, 10, 12 and 14 are, respectively in order from object plane OB to image plane IM, PPNP. The stop aperture (not shown) is preferably located at the front surface of the third negative lens 12 facing the direction of the object OB. Alternatively, the stop aperture can be on the back surface of second positive lens 10 facing the direction of the plane of the image IM, or at the front surface of lens 10 facing the object, or at the back surface of lens 12 facing the image. The stop aperture can also alternatively be placed between the second lens 10 and the third lens 12, and may be disposed inside either of lenses 10 or 12.

The four lens design of FIG. 4 and Table 4 is also corrected over a narrow bandwidth $\Delta\lambda$ of approximately 10 nm, and can be operated at any of a range of center wavelengths from the UV or IR, and particularly through the visible spectrum, by adjusting the object/image conjugate. The bandwidth can be increased if one or more diffractive surfaces is used. A diffractive surface can be disposed, e.g., on the front surface of the second lens 10 facing the object plane OB direction, on the back surface of the second lens 10 facing the other direction towards the image plane IM, on the back surface of the third lens 12 facing the image plane, or at the front surface of fourth lens 14 facing the direction of the position of the object OB. Such additional diffractive surface may be included for increasing the corrected bandwidth to over 100 nm.

All four lenses 8, 10, 12 and 14 are preferably made from plastic materials, and preferably two types of plastic materials are used, although a single material and more than two materials may be used. A COC material is preferably used for the positive lenses 8, 10 and 14, while polystyrene is preferred for the negative lens 12. The COC material can be substituted for by other crown-like materials and polystyrene can be substituted for with other flint-like materials. The combination of the second lens 10 and the third lens 12 contributes limited chromatic aberration correction. The first lens 8 is particularly preferred to be positive which allows a cone of diverging light from the object OB to begin to converge as soon as possible. This advantageously allows the diameter OD of the design to be small, as is desired for the miniature microscope objective. The preferred third lens 12 is advantageously negative allowing a flat image field to be achieved.

The placement of the negative lens 12 in the preferred embodiment of FIG. 4 is preferably in the third position from the object OB, as shown. In an alternative embodiment, the fourth lens 14 may also be negative in a PPNN design, or the third lens 12 may be positive, while the fourth lens 14 is negative in a PPPN design. Although having at least one negative lens is advantageous particularly for providing chromatic aberration correction, it is preferred that neither the first lens 8 nor the second lens 10 be negative. This is the case for the same reason why it is preferred that the 3-lens design have the form of PPN, rather than PNP or NPP. That is, the NA is very large in object space, which means the light is entering into the microscope objective at a very large divergence angle. To keep the diameter of the optics small, the light is preferably as severely refracted as practical as soon as possible. This is why the first lens is preferably positive. At NA=0.6 it is difficult if not impractical to refract the light to a degree where it starts to converge after one lens without introducing an uncorrectable amount of aberration. For this reason, it is preferred that the second lens also be positive. The negative lens is preferred as providing aberration and field curvature correction. It is preferred that the negative lens be the third lens in the four lens PPNP design, because the PNP structure of the second, third and fourth lenses of the PPNP four lens design provides enhanced correction than a PPN structure of a PPPN design, although the PPPN design is alternatively preferred herein and described below with reference to FIG. 6 and Table 5.

It is preferred to have an objective including multiple lenses with a high number of geometrically and/or optically non-planar surfaces. For example, it is particularly preferred that the negative lens has two such non-planar surfaces. A higher number of non-planar surfaces is advantageous due to additional degrees of freedom, in term of shape factor, for aberration correction. It is also preferred that one or more of the positive lenses have two such non-planar surfaces. Alternatively, any of the lenses may have one planar and one non-planar surface.

Figure 6:
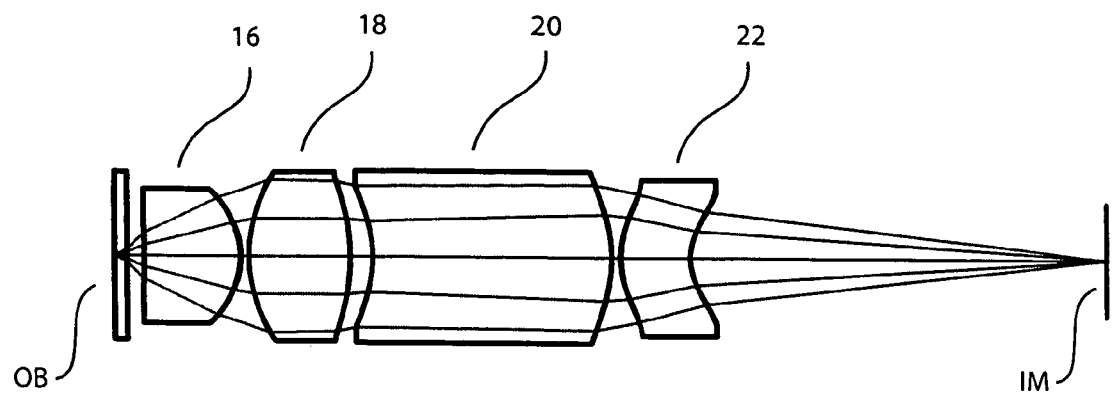
FIG. 6 schematically illustrates an optical layout for a four lens (PPPN) miniature objective design for MMA according to a preferred embodiment.

The alternative PPPN four lens design is schematically illustrated at FIG. 6. Corresponding prescription data for this PPPN design, which includes three positive lenses 16, 18 and 20 from the object OB to the image IM, and a fourth negative lens 22, are provided at Table 5, below. Note that it is preferred that each lens 16, 18, 20 and 22 be formed of a high dispersion, plastic material such as polystyrene, although different combinations of materials may be used.

Figure 7:
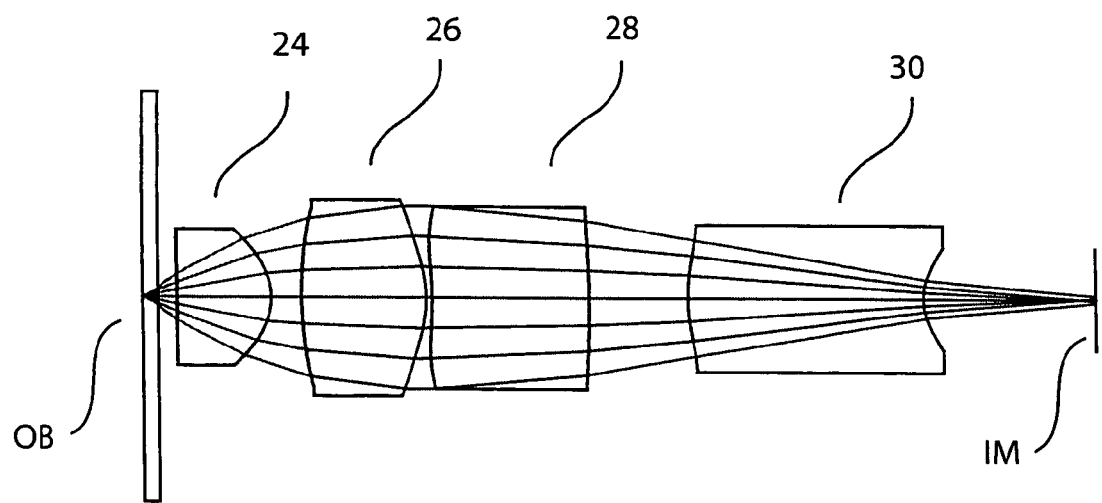
FIG. 7 schematically illustrates an optical layout for a four lens (PPNN) miniature objective design for MMA according to a preferred embodiment.

An alternative PPNN four lens design, including two positive lenses 24 and 26, and two negative lenses 28 and 30, from object OB to image IM, is schematically illustrated at FIG. 7, and the prescription data are provided at Table 4, below. All of the lenses 24, 26, 28 and 30 may be made by low dispersion, crown-like materials such as COC, or as suggested at Table 6, one of the lenses, e.g., the third lens 28, may alternatively be formed of high dispersion flint-like material such as polystyrene.

TABLE 5

PRESCRIPTION FOR FIG. 6, PPPN DESIGN

| Surf | Radius | Thickness | Glass | Diameter | Conic | 2nd term | 4th term | 6th term | 8th term |
|---|---|---|---|---|---|---|---|---|---|
| OBJ | Infinity | 0.150 | BK7 | 0.22 | 0.00 | | | | |
| 1 | Infinity | 0.200 | | 2.00 | 0.00 | | | | |
| 2 | −5.506 | 1.100 | POLYSTYR | 0.78 | −1159.02 | | | | |
| 3 | −1.000 | 0.100 | | 1.60 | −0.32 | | | | |
| 4 | Infinity | 1.200 | POLYSTYR | 2.00 | 0.00 | 0.348 | −0.052 | 0.02 | |
| 5 | Infinity | 0.271 | | 1.90 | 0.00 | −0.209 | −0.011 | 0.022 | |
| STO | −1.275 | 2.784 | POLYSTYR | 1.65 | −4.69 | | | | |
| 7 | −1.601 | 0.100 | | 2.00 | −5.26 | | | | |
| 8 | Infinity | 0.748 | POLYSTYR | 1.82 | 0.00 | 0.455 | −0.071 | −0.182 | 0.009 |
| 9 | Infinity | 4.969 | | 1.59 | 0.00 | 0.848 | −0.747 | 0.233 | |
| IMA | Infinity | | | 1.34 | 0.00 | | | | |

TABLE 6

PRESCRIPTION FOR FIG. 7, PPNN DESIGN

| Surf | Radius | Thickness | Glass | Diameter | Conic | 4th term | 6th term | 8th term |
|---|---|---|---|---|---|---|---|---|
| OBJ | Infinity | 0.15 | BK7 | 0.22 | 0 | | | |
| 1 | Infinity | 0.15 | | 0.392 | 0.000 | | | |
| 2 | −23.26136 | 0.9217052 | COC | 0.688 | 0.000 | | | |
| 3 | −0.6276505 | 0.2880671 | | 1.328 | −0.888 | | | |

TABLE 6-continued

PRESCRIPTION FOR FIG. 7, PPNN DESIGN

| Surf | Radius | Thickness | Glass | Diameter | Conic | 4th term | 6th term | 8th term |
|---|---|---|---|---|---|---|---|---|
| 4 | 4.496001 | 1.171553 | COC | 1.740 | 8.129 | | | |
| 5 | -1.129526 | 0.0561837 | | 1.908 | -5.950 | | | |
| STO | -2.864257 | 1.536427 | POLYSTYR | 1.777 | 0.000 | 0.41 | -0.21 | 0.031 |
| 7 | -9.683873 | 0.9455018 | | 1.698 | -209.664 | | | |
| 8 | 1.743356 | 2.240533 | COC | 1.436 | 0.000 | -0.19 | -0.11 | -0.099 |
| 9 | 0.5305556 | 1.417645 | | 0.997 | -2.247 | | | |
| IMA | Infinity | | | 1.485 | 0.000 | | | |

Figure 8:
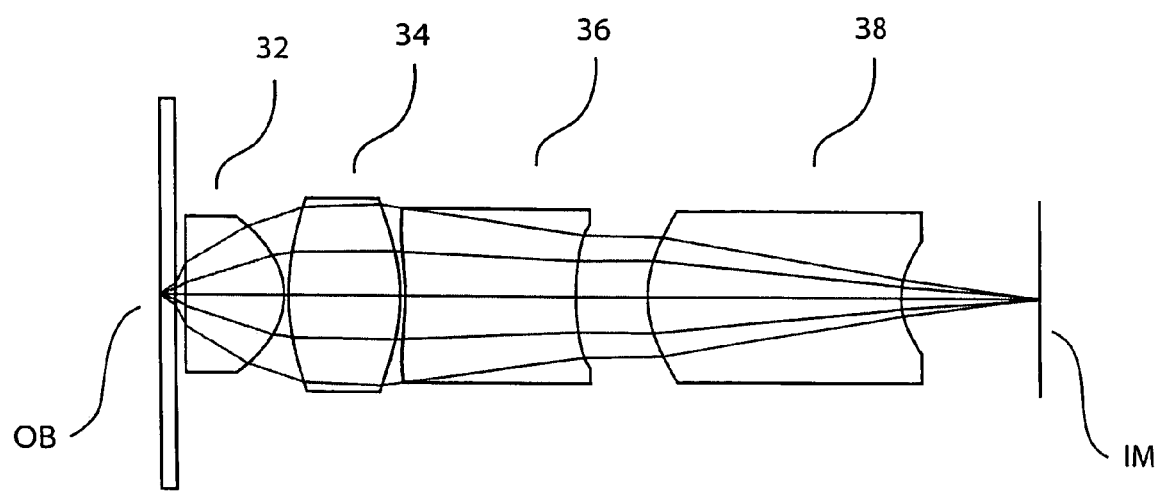
FIG. 8 schematically illustrates an optical layout for a four lens (PPNP) miniature objective design for MMA having NA=0.9 according to a preferred embodiment.

A NA=0.9, four lens design is specifically schematically illustrated at FIG. 8 and includes from object OB to image IM a first positive lens 32, a second positive lens 34, a third negative lens 36 and the fourth positive lens 38. Thus, the objective illustrated at FIG. 8 follows the form of PPNP. The corresponding prescription data is given in Table 7. The FOV is 220 μm and diameter OD is 2 mm. The FOV-to-diameter ratio is (FOV/OD)=0.11. The magnification is approximately 7×. This design is constructed using both glass and plastic materials. Low dispersion material is preferably used for the first, second and fourth lenses 32, 34 and 38 such as LAK-10 and/or COC, and higher dispersion materials such as polystyrene are preferably used for the third lens 36.

TABLE 7

PRESCRIPTION FOR FIG. 8, NA = 0.9 DESIGN

| Surf | Radius | Thickness | Glass | Diameter | Conic | 4th order | 6th order | 8th order |
|---|---|---|---|---|---|---|---|---|
| OBJ | Infinity | 0.1500 | BK7 | 0.220 | 0 | | | |
| 1 | Infinity | 0.1000 | | 0.461 | 0 | | | |
| 2 | Infinity | 1.0000 | LAK10 | 0.881 | 0 | | | |
| 3 | -0.728 | 0.0500 | | 1.603 | -0.729 | | | |
| 4 | 2.538 | 1.1175 | LAK10 | 1.975 | -2.669 | | | |
| 5 | -1.999 | 0.0500 | | 1.985 | -5.409 | | | |
| STO | -2.527 | 1.7237 | POLYSTYR | 1.787 | 0 | 0.342 | -0.204 | 0.053 |
| 7 | 2.936 | 0.7130 | | 1.476 | 12.886 | | | |
| 8 | 1.105 | 2.5704 | COC | 1.761 | 0 | -0.175 | -0.055 | |
| 9 | 0.720 | 1.4759 | | 1.158 | -1.920 | | | |
| IMA | Infinity | | | 1.583 | 0 | | | |

Note that it may be advantageous for any of the objective designs described herein, to modify their prescription to include a convex surface as the final surface facing the image sensor. For example, in the three lens PPN design, the convex surface would be on the surface of the third negative lens facing the image sensor, and in the four lens PPNP design, the convex surface would be on the surface of the fourth positive lens facing the image sensor. The final convex surface would serve to diverge light reflected back from the surface of the image sensor.

The specific embodiments described in the specification, drawings, summary of the invention and abstract of the disclosure are not intended to limit the scope of any of the claims, but are only meant to provide illustrative examples of the invention to which the claims are drawn. The scope of the present invention is understood to be encompassed by the language of the claims, and structural and functional equivalents thereof.

What is claimed is:

1. A miniature microscope objective for a microscope array, comprising three lenses whose refractive surfaces are substantially separated from the closest surface of any respective adjacent optical element and that have non-zero power disposed between the object plane and the image plane including, from the object plane to the image plane a first positive lens, a second positive lens and a third negative lens, the objective having a certain numerical aperture (NA), and having a magnification (M) below approximately an outer diameter (OD) divided by a field of view (FOV) of the objective and less than or equal to twelve.

2. The objective of claim 1, wherein the magnification (M) is less than approximately 12.

3. The objective of claim 1, wherein the numerical aperture is at least 0.4.

4. A miniature microscope objective for a microscope array, comprising three lenses whose refractive surfaces are substantially separated from the closest surface of any respective adjacent optical element and that have non-zero power disposed between the object plane and the image plane including, from the object plane to the image plane a first positive lens, a second positive lens, and a third negative lens, the objective having a numerical aperture (NA) greater than 0.4 and no more than approximately 0.8, and having a magnification (M) between approximately 1 and 12, such that a ratio of M to NA has a magnitude that is greater than 1 and less than substantially 30.

5. The objective of claim 4, wherein the magnification (M) is greater than 4.

6. The objective of any of claims 1 or 4, further comprising an aperture stop at a location selected from the group consisting of the back surface of the second positive lens, the front surface of the second positive lens and inside the second positive lens.

7. The objective of any of claims 1 or 4, wherein the first positive lens comprises a design selected from the group consisting of a plano-convex design and a meniscus design.

8. The objective of any of claims 1 or 4, wherein the second positive lens comprises a design selected from the group consisting of a bi-convex design and a plano-convex design.

9. The objective of any of claims 1 or 4, wherein the third negative lens comprises a meniscus design.

10. The objective of any of claims 1 or 4, wherein the third negative lens comprises a bi-concave design.

11. The objective of any of claims 1 or 4, wherein the objective is corrected over a bandwidth of at least substantially 10 nm.

12. The objective of any of claims 1 or 4, further comprising a diffractive surface, and wherein the objective is corrected over a bandwidth of substantially 100 nm or more.

13. The objective of claim 12, wherein the diffractive surface is disposed on the front surface of the second positive lens.

14. The objective of any of claims 1 or 4, wherein each lens comprises a low-dispersion, crown-like material.

15. The objective of claim 14, wherein said crown-like material includes cycloolefin copolymer.

16. The objective of claim 14, wherein said crown-like material includes cycloolefin polymer.

17. The objective of any of claims 1 or 4, wherein the first and second positive lenses comprise a low-dispersion, crown-like material, and the third negative lens comprises a higher dispersion, flint-like material.

18. The objective of claim 17, wherein said crown-like material includes one of cycloolefin copolymer and cycloolefin polymer, and said flint-like material includes polystyrene.

19. The objective of claim 17, wherein said crown-like material includes LAK-10, and said flint-like material includes polystyrene.

20. The objective of any of claims 1 or 4, wherein at least one of the lenses comprises a gradient index lens.

21. A miniature microscope objective for a microscope array, comprising three singlet lenses whose refractive surfaces are substantially separated from the closest surface of any respective adjacent optical element and that have non-zero power disposed between the object plane and the image plane including, from the object plane to the image plane, a first positive lens, the objective having a magnification (M) between approximately 1 and 12.

22. The objective of claim 21, wherein, from object to image, at least one of the second and third lenses is negative.

23. The objective of claim 22, wherein the second lens is positive.

24. The objective of claim 21, wherein the second lens is positive.

25. The objective of claim 21, wherein the magnification is greater than 4.

26. A miniature microscope objective, comprising three lenses whose refractive surfaces are substantially separated from the closest surface of any respective adjacent optical element and that have non-zero power disposed between the object plane and the image plane including, from the object plane to the image plane, a first positive lens, a second positive lens, and a third negative lens, the objective having a numerical aperture (NA) greater than 0.4 and no more than approximately 0.8, and having a magnification (M) between approximately 1 and 12, such that a ratio of M to NA has a magnitude that is greater than 1 and less than substantially 30.

27. The objective of claim 26, wherein the magnification (M) is greater than 4, and the ratio of M to NA is thereby greater than approximately 5.

28. A miniature microscope objective, comprising three lenses whose refractive surfaces are substantially separated from the closest surface of any respective adjacent optical element and that have non-zero power disposed between the object plane and the image plane including, from the object plane to the image plane, a first positive lens, a second positive lens and a third negative lens, the objective having a certain numerical aperture (NA), and having a magnification (M) below approximately an outer diameter (OD) divided by a field of view (FOV) of the objective and less than or equal to twelve.

29. The objective of any of claims 1, 4, 21, 26, or 28, wherein the final lens surface facing the image is convex.

30. A miniature microscope objective for a microscope array, comprising three lenses whose refractive surfaces are substantially separated from the closest surface of any respective adjacent optical element and that have non-zero power disposed between the object plane and the image plane including, from the object plane to the image plane, a first positive lens, a second positive lens and a third negative lens, the third negative lens comprising a meniscus design, the objective having a certain numerical aperture (NA) and a magnification (M) below approximately an outer diameter (OD) divided by a field of view (FOV) of the objective.

31. A miniature microscope objective for a microscope array, comprising three lenses whose refractive surfaces are substantially separated from the closest surface of any respective adjacent optical element and that have non-zero power disposed between the object plane and the image plane including, from the object plane to the image plane a first positive lens, a second positive lens and a third negative lens, the third negative lens comprising a bi-concave design, the objective having a certain numerical aperture (NA) and a magnification (M) below approximately an outer diameter (OD) divided by a field of view (FOV) of the objective.

32. A miniature microscope objective for a microscope array, comprising three lenses whose refractive surfaces are substantially separated from the closest surface of any respective adjacent optical element and that have non-zero power disposed between the object plane and the image plane including, from the object plane to the image plane a first positive lens, a second positive lens and a third negative lens, the objective having a certain numerical aperture (NA) and a magnification (M) below approximately an outer diameter (OD) divided by a field of view (FOV) of the objective, the objective being corrected over a bandwidth of substantially 10 nm or more.

33. A miniature microscope objective for a microscope array, comprising three lenses that have non-zero power disposed between the object plane and the image plane including, from the object plane to the image plane, a first positive lens, a second positive lens and a third negative lens, and a diffractive surface, the objective having a certain numerical aperture (NA) and a magnification (M) below approximately an outer diameter (OD) divided by a field of view (FOV) of the objective, and being corrected over a bandwidth of 100 nm or more.

34. The objective of claim 33, wherein the diffractive surface is disposed on the front surface of the second positive lens.

35. A miniature microscope objective for a miniature microscope array (MMA), comprising at least three lenses including from object to image a first positive lens, a second positive lens and a third negative lens, each lens comprising a low-dispersion, crown-like material, the objective having a certain numerical aperture (NA), and a magnification (M) below approximately an outer diameter (OD) divided by a field of view (FOV) of the objective, such that a ratio of M to NA is less than the outer diameter (OD) divided by the product of field of view (FOV) and numerical aperture (NA).

36. The objective of claim 35, wherein said crown-like material includes cycloolefin copolymer.

37. A miniature microscope objective for a microscope array comprising three lenses whose refractive surfaces are substantially separated from the closest surface of any respective adjacent optical element and that have non-zero power disposed between the object plane and the image plane including, from the object plane to the image plane a first positive lens, a second positive lens and a third negative lens, the first and second positive lenses comprising a low-dispersion, crown-like material and the third negative lens comprising a higher dispersion, flint-like material, the objective having a certain numerical aperture (NA), and a magnification (M) below approximately an outer diameter (OD) divided by a field of view (FOV) of the objective.

38. The objective of claim 37, wherein said crown-like material includes one of cycloolefin copolymer and cycloolefin polymer, and said flint-like material includes polystyrene.

39. The objective of claim 38, wherein said crown-like material includes LAK-10 and said flint-like material includes polystyrene.

40. A miniature microscope objective for a microscope array, comprising three lenses that have non-zero power disposed between the object plane and the image plane including, from the object plane to the image plane, a first positive lens, a second positive lens and a third negative lens, the objective having a certain numerical aperture (NA), and a magnification (M) below approximately an outer diameter (OD) divided by a field of view (FOV) of the objective, at least one of the at least three lenses comprising a gradient index lens.

41. A miniature microscope objective for a miniature microscope array, comprising at least three lenses including from object to image a first positive lens, a second positive lens and a third negative lens, having a certain numerical aperture (NA), and having a magnification (M) below approximately an outer diameter (OD) divided by a field of view (FOV) of the objective and less than or equal to twelve, the objective comprising an aperture stop at a location selected from the group consisting of the back surface of the second positive lens, the front surface of the second positive lens and inside the second positive lens.

42. A miniature microscope objective for a miniature microscope array, comprising at least three lenses including from object to image a first positive lens, a second positive lens, and a third negative lens, having a numerical aperture (NA) greater than 0.4 and no more than approximately 0.8, and having a magnification (M) between approximately 1 and 12, such that a ratio of M to NA has a magnitude that is greater than 1 and less than substantially 30, the objective further comprising an aperture stop at a location selected from the group consisting of the back surface of the second positive lens, the front surface of the second positive lens and inside the second positive lens.

43. A miniature microscope objective for a miniature microscope array, comprising at least three lenses including from object to image a first positive lens, a second positive lens and a third negative lens, and having a certain numerical aperture (NA), and a magnification (M) below approximately an outer diameter (OD) divided by a field of view (FOV) of the objective, such that a ratio of M to NA is less than the outer diameter OD divided by the product of field of view (FOV) and numerical aperture (NA), the magnification (M) also being less than or equal to twelve, the objective further comprising a diffractive surface and being corrected over a bandwidth of substantially 100 nm or more.

44. The objective of claim 43, wherein the diffractive surface is disposed on the front surface of the second positive lens.

45. A miniature microscope objective for a miniature microscope array, comprising at least three lenses including from object to image a first positive lens, a second positive lens, and a third negative lens, and having a numerical aperture (NA) greater than 0.4 and no more than approximately 0.8, and having a magnification (M) between approximately 1 and 12, such that a ratio of M to NA has a magnitude that is greater than 1 and less than substantially 30, the objective further comprising a diffractive surface and being corrected over a bandwidth of substantially 100 nm or more.

46. The objective of claim 45, wherein the diffractive surface is disposed on the front surface of the second positive lens.

47. A miniature microscope objective for a miniature microscope array, comprising at least three lenses including from object to image a first positive lens, a second positive lens and a third negative lens, and having a certain numerical aperture (NA), a magnification (M) below approximately an outer diameter (OD) divided by a field of view (FOV) of the objective, such that a ratio of M to NA is less than the outer diameter OD divided by the product of field of view (FOV) and numerical aperture (NA), the magnification (M) also being less than or equal to twelve, and wherein each lens comprises a low-dispersion, crown-like material.

48. The objective of claim 47, wherein said crown-like material includes cycloolefin copolymer.

49. The objective of claim 47, wherein said crown-like material includes cycloolefin polymer.

50. A miniature microscope objective for a miniature microscope array, comprising at least three lenses including from object to image a first positive lens, a second positive lens, and a third negative lens, and having a numerical aperture (NA) greater than 0.4 and no more than approximately 0.8, and having a magnification (M) between approximately 1 and 12, such that a ratio of M to NA has a magnitude that is greater than 1 and less than substantially 30, wherein each lens comprises a low-dispersion, crown-like material.

51. The objective of claim 50, wherein said crown-like material includes cycloolefin copolymer.

52. The objective of claim 50, wherein said crown-like material includes cycloolefin polymer.

53. A miniature microscope objective for a miniature microscope array, comprising at least three lenses including from object to image a first positive lens, a second positive lens and a third negative lens, and having a certain numerical aperture (NA), and a magnification (M) below approximately an outer diameter (OD) divided by a field of view (FOV) of the objective, such that a ratio of M to NA is less than the outer diameter OD divided by the product of field of view (FOV) and numerical aperture (NA) and the magnification (M) is less than or equal to twelve, and wherein the first and second positive lenses comprise a low-dispersion, crown-like material, and the third negative lens comprises a higher dispersion, flint-like material.

54. The objective of claim 53, wherein said crown-like material includes one of cycloolefin copolymer and cycloolefin polymer and said flint-like material includes polystyrene.

55. The objective of claim 53, wherein said crown-like material includes LAK-10, and said flint-like material includes polystyrene.

56. A miniature microscope objective for a miniature microscope array, comprising at least three lenses including from object to image a first positive lens, a second positive lens, and a third negative lens, and having a numerical aperture (NA) greater than 0.4 and no more than approximately 0.8, and having a magnification (M) between approximately 1 and 12, such that a ratio of M to NA has a magnitude that is greater than 1 and less than substantially 30, and wherein the first and second positive lenses comprise a low-dispersion, crown-like material, and the third negative lens comprises a higher dispersion, flint-like material.

57. The objective of claim 56, wherein said crown-like material includes one of cycloolefin copolymer and cycloolefin polymer and said flint-like material includes polystyrene.

58. The objective of claim 56, wherein said crown-like material includes LAK-10, and said flint-like material includes polystyrene.

59. A miniature microscope objective for a miniature microscope array, comprising at least three lenses including from object to image a first positive lens, a second positive lens and a third negative lens, and a diffractive surface, the objective having a certain numerical aperture (NA), and a magnification (M) below approximately an outer diameter (OD) divided by a field of view (FOV) of the objective, such that a ratio of M to NA is less than the outer diameter (OD) divided by the product of field of view (FOV) and numerical aperture (NA), and being corrected over a bandwidth of 100 nm or more, and wherein the diffractive surface is disposed on the front surface of the second positive lens.

60. A miniature microscope objective for a miniature microscope array, comprising at least three lenses including from object to image a first positive lens, a second positive lens and a third negative lens, the first and second positive lenses comprising a low-dispersion, crown-like material and the third negative lens comprising a higher dispersion, flint-like material, the objective having a certain numerical aperture (NA), and a magnification (M) below approximately an outer diameter (OD) divided by a field of view (FOV) of the objective, such that a ratio of M to NA is less than the outer diameter (OD) divided by the product of field of view (FOV) and numerical aperture (NA), and said crown-like material includes one of cycloolefin copolymer and cycloolefin polymer, and said flint-like material includes polystyrene.

61. The objective of claim 60, wherein said crown-like material includes LAK-10 and said flint-like material includes polystyrene.

* * * * *